United States Patent [19]
Tresp et al.

[11] Patent Number: 5,751,571
[45] Date of Patent: May 12, 1998

[54] PROCESS AND APPARATUS FOR DETERMINING OPTIMUM VALUES FOR MANIPULATED VARIABLES OF A TECHNICAL SYSTEM

[75] Inventors: Volker Tresp, München; Bernd Schürmann, Haimhausen; Martin Schlang, München, all of Germany

[73] Assignee: Siemens Aktiengesellschaft, Munich, Germany

[21] Appl. No.: 578,600

[22] PCT Filed: Jul. 1, 1994

[86] PCT No.: PCT/DE94/00762

§ 371 Date: Jan. 4, 1996

§ 102(e) Date: Jan. 4, 1996

[87] PCT Pub. No.: WO95/02213

PCT Pub. Date: Jan. 19, 1995

[30] Foreign Application Priority Data

Jul. 5, 1993 [DE] Germany .................. 43 22 365.6

[51] Int. Cl.⁶ .................. G05B 13/04; G06F 15/18
[52] U.S. Cl. .................. 364/148; 364/149; 364/157; 395/21; 395/906
[58] Field of Search .................. 364/148, 149–151, 364/152–159, 164, 165, 176, 178, 179; 395/21–23, 904, 905, 912, 913, 919, 906

[56] References Cited

U.S. PATENT DOCUMENTS

| | | | |
|---|---|---|---|
| 5,016,188 | 5/1991 | Lan | 364/172 X |
| 5,159,660 | 10/1992 | Lu et al. | 364/148 X |
| 5,353,207 | 10/1994 | Keeler et al. | 364/164 |
| 5,414,619 | 5/1995 | Katayama et al. | 364/151 |
| 5,428,559 | 6/1995 | Kano | 364/151 X |
| 5,513,098 | 4/1996 | Spall et al. | 364/157 X |

FOREIGN PATENT DOCUMENTS

| | | |
|---|---|---|
| 0 176 794 | 4/1986 | European Pat. Off. . |
| 0 355 249 | 2/1990 | European Pat. Off. . |
| 0 508 202 | 10/1992 | European Pat. Off. . |
| 0 531 712 | 3/1993 | European Pat. Off. . |
| 0 588 594 | 3/1994 | European Pat. Off. . |
| WO 91/10961 | 7/1991 | WIPO . |
| WO 93/12475 | 6/1993 | WIPO . |
| WO 93/12476 | 6/1993 | WIPO . |
| WO 93/25943 | 12/1993 | WIPO . |

OTHER PUBLICATIONS

Advances in Instrumentation, vol. 41, No. 2, (1986), "A Modular Self–Tuning Control System", J.D. Lane, pp. 639–651.

Proceedings of the 1992 IEEE International Symposium on Intelligent Control, Aug. 1992, "Least Mean Square Learning in Associative Memory Networks", M. Brown and C.J. Harris, pp. 531–536.

Automatisierungstechnik at 37 (1989) 2, Modellgestuetzte Regelungskonzepte: Ein Vergleich, (Model–based control schemes: a comparison) P. Ronge, pp. 74–84.

*Primary Examiner*—Joseph Ruggiero
*Attorney, Agent, or Firm*—Hill, Steadman & Simpson

[57] ABSTRACT

Optimum values for manipulated variables $s_1, \ldots, s_S$ of a technical system ($\phi$) are determined for prescribed operational variables $b_1, \ldots, b_B$ in order to optimize a prescribed target function $z=g(y_2, \ldots, y_N)$ of system properties $y_2, \ldots, y_N$ where $y_i = \phi_i(s_1, \ldots, s_S, b_1, \ldots, b_B)$. Here, a set of functions $f_i(w_1, \ldots, w_W, x_1, \ldots, x_{S=B})$ is used whose parameters $w_1, \ldots, w_W$ are set in such a way that the functions $f_i$ model the system in such a way that the functions $f_i$ approximate the system functions $\phi i$ as functions of their variables $x_1, \ldots, x_{S+B}$ in terms of an interval of prescribed magnitude; the manipulated variables $s_1, \ldots, s_S$ are determined by optimizing the function $g(f_1(w_1, \ldots, w_W, s_1, \ldots, s_S, b_1, \ldots, b_B), \ldots, f_N(w_1, \ldots, w_W, s_1, \ldots, s_S, b_1, \ldots, b_B))$ at fixed values of $w_1, \ldots, w_W$ and $b_1, \ldots, b_B$.

9 Claims, 1 Drawing Sheet

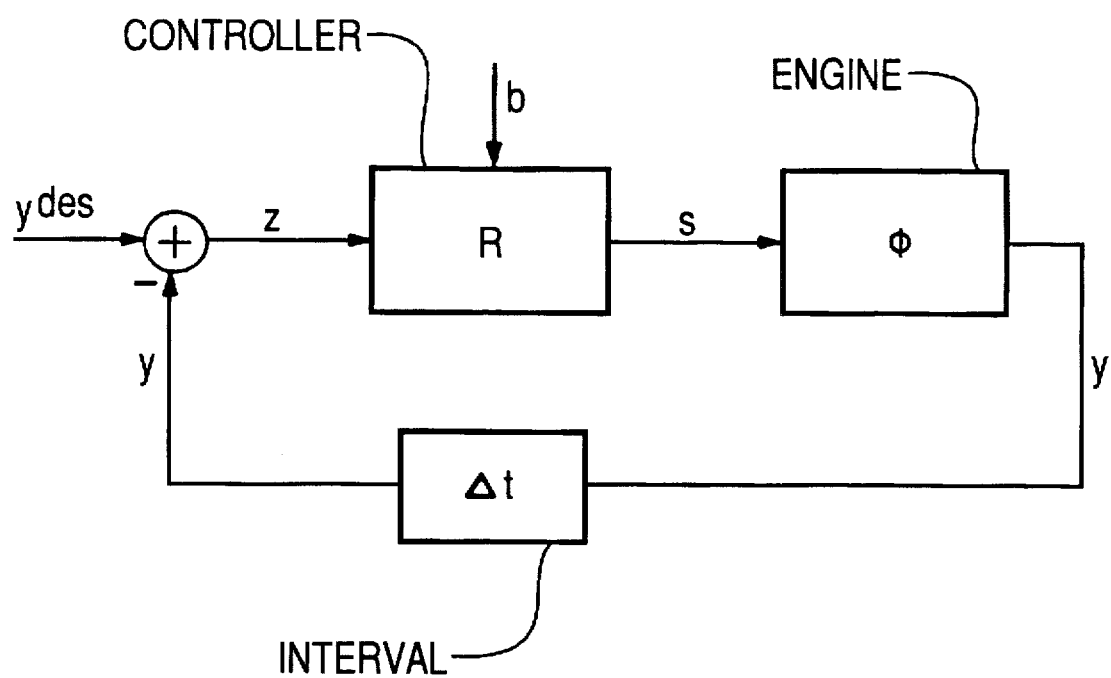

PROCESS AND APPARATUS FOR DETERMINING OPTIMUM VALUES FOR MANIPULATED VARIABLES OF A TECHNICAL SYSTEM

BACKGROUND OF THE INVENTION

The invention relates to a process for determining optimum values for manipulated variables of a technical system ($\phi$). In this context, such a technical system can be of any desired, for example electrical, mechanical or chemical nature and many others. An example of such a system ($\phi$) is an internal combustion engine for motor vehicles, for example a gasoline engine which is to be optimized with respect to some of its system properties $y_1, \ldots, y_N$ such as for example the emission of NOX (nitrogen oxides), the emission of CO (carbon monoxide), the consumption of fuel or the engine power etc. Here, these variables $y_1, \ldots, y_N$ are weighted to different degrees in a global, possibly nonlinear target function $z=g(y_1, \ldots, y_N)$ which is to be optimized in its entirety.

The system properties $y_1, \ldots, y_N$ usually depend on the operating conditions of the system. The latter are characterized by operational variables $b_1, \ldots, b_B$ (for example rotational speed, torque, etc. in the case of a gasoline engine) and by manipulated variables $s_1, \ldots, s_S$ (for example ignition angle, injection time etc. in the case of a gasoline engine). The operational variables are prescribed here by wishes of a user or other circumstances. In the case of a gasoline engine the driver prescribes a rotational speed using the gas pedal, for example, in order to travel at a specific speed with a selected transmission ratio. The manipulated variables $s_1, \ldots, s_S$ must be set (that is to say in this example the engine must be controlled) in such a way that the desired or prescribed operational variables are also actually set.

There is generally no clear solution to this problem. As is generally known, there are sporty and economical motor vehicle drivers. Therefore, depending on the setting of the manipulated variables $s_1, \ldots, s_S$, different values for the system properties $y_1, \ldots, y_N$(for example fuel consumption, emission of pollutants etc.) and thus different values for the target function $z=g(y_1, \ldots, y_N)$ are obtained with the same operational variables $b_1, \ldots, b_B$. Therefore, it is desirable to set the manipulated variables in such a way that the prescribed target function is optimized.

In the least commercially interesting technical systems, the relationships $y_i=\phi_i(s_1, \ldots, s_S, b_1, \ldots, b_B)$ between the manipulated variables and operational variables on the one hand and the system properties on the other are known quantitatively in closed form. For this reason, for optimization one is generally obliged to have recourse to experiments with the technical system itself. Such experiments are frequently too expensive or are impossible for reasons of safety.

SUMMARY OF THE INVENTION

The invention is based on the object of disclosing a process for determining optimum values for manipulated variables of a technical system in the aforesaid context, which process can be carried out without experimenting with the technical system and without a system model in closed form having to be available.

According to the invention, this object is achieved by means of a process for determining optimum values for manipulated variables of a technical system. In this process, a set of functions $f_i(w_1, \ldots, w_W, x_1, \ldots, x_{S+B})$ is used whose parameters $w_1, \ldots, w_W$ are set in such a way that the functions $f_i$ model the system in such a way that the functions $f_i$ approximate the system functions $\phi i$ as functions of their variables $x_1, \ldots, x_{S+B}$ in terms of an interval of prescribed magnitude and the manipulated variables $s_1, \ldots, s_S$ are determined by optimizing the function $g(f_1(w_1, \ldots, w_W, s_1, \ldots, s_S, b_1, \ldots, b_B), \ldots, f_N(w_1, \ldots, w_W, s_1, \ldots, s_S, b_1, \ldots, b_B))$ at fixed values of $w_1, \ldots, w_W$ and $b_1, \ldots, b_B$. The technical system is therefore represented, for the purposes of optimization, by a parametric function model whose parameters have been adapted in such a way that the function model approximates the technical system with adequate precision. As a result, the measurements of the system properties which are necessary for the adaptation of the parameters are separated from the actual optimization process. The measurements can therefore be carried out under particularly favorable conditions which—in contrast to measurements for experimental optimizations—are no longer influenced by the requirements of the optimization process.

Furthermore, this process has the advantage that the target function can be varied without the parameters $w_1, \ldots, w_W$ of the set of functions $f_i(w_1, \ldots, w_W, x_1, \ldots, x_{S+B})$ having to be reset, the system can be optimized at various working points by setting various operational variables without additional outlay, an existing system model (function set) can be used as a starting point for modelling further systems and thus for accelerating the modelling of further systems.

In general terms the present invention is a process for determining optimum values for manipulated variables of a technical system for prescribed operational variables with the objective of optimizing a prescribed target function of system properties that are a function of the manipulated variables and the operational variables. A set of functions is used whose parameters are set such that the functions model the system such that the functions approximate the system functions as functions of their variables in terms of an interval of prescribed magnitude. The manipulated variables are determined by optimizing the set of functions at fixed values of the parameters and the operational variables.

Advantageous developments of the present invention are as follows.

The set of functions is represented by an artificial neural network, or by a table of numerical values which is stored in a storage unit of a data processing system, or by an electronic circuit arrangement which is a component of an electronic data processing system that carries out the process, or which interacts with such an electronic data processing system.

The process is used in one embodiment for controlling a technical system. The target function is the control error of a controller and the manipulated variables of the controller being identified using this process.

The present invention is also a control system for controlling a technical system using a controller with the following features. The controller identifies manipulated variables for the system to be controlled (by means of prescribed values for operational variables of the system to be controlled) by minimizing a control error. The system to be controlled supplies measured values for system properties that are a function of the manipulated variables and the operation variables. The system properties are themselves used to determine the control error. The control error is minimized by means of the following measures. A set of functions is used whose parameters are set such that the functions model the system such that the functions approximate the system functions as functions of their variables in terms of an interval of prescribed magnitude. The manipulated variables are determined by optimizing the set of functions at fixed values of the parameters and the operational variables.

The control error is identified from the system properties and from desired values for these system properties. The control error is identified from system properties and from desired values for these system properties.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing, in which:

The single FIGURE shows a control system with a closed control loop for controlling a technical system, the controller identifying the manipulated variables using the process according to the invention.

DESCRIPTION OF THE PREFERRED EMBODIMENTS

For this purpose, a technical system ($\phi$) is considered, for example a gasoline engine which is to be operated with prescribed operational variables $b_1, \ldots, b_B$. By suitably selecting the values of a number of manipulated variables, the system can be transferred to the operating state $b_1, \ldots, b_B$. In this operating state, the system has the properties $y_1, \ldots, y_N$ where $y_i = \phi_i(s_1, \ldots, s_S, b_1, \ldots, b_B)$. In a given operating state, the properties of the system are therefore still dependent on the values of the manipulated variables.

In most technical systems, the selection of the manipulated variables is not unambiguous for prescribed operational variables; instead, the manipulated variables can be set in very different ways and the prescribed operating state is nevertheless obtained. Generally, one will therefore want to select the manipulated variables in such a way that the system properties are optimized in such a way that a prescribed target function $z = g(y_1, \ldots, y_N)$ is optimized.

The invention achieves this object using a suitable set of functions $f_i(w_1, \ldots, w_W, x_1, \ldots, x_{S+B})$ which approximates the system or the system functions $y_i = \phi_i(s_1, \ldots, s_S, b_1, \ldots, b_B)$ in terms of an interval of prescribed magnitude. Such function systems, which depend on parameters $w_1, \ldots, w_W$ and with which the behavior of any technical system can be modelled within any prescribed range of precision, are known in large numbers to the person skilled in the art. Examples of these are orthogonal function systems, interpolation polynomials, spline functions etc. In the standard works on numerical mathematics for engineers or those on approximation theory, the person skilled in the art will find a large number of numerical techniques for determining the parameters $w_1, \ldots, w_W$ for which a selected function system approximates, that is to say models, a given technical system with adequate precision.

Finally, so-called artificial neural networks are also parametric function systems in which the parameters are frequently referred to as (synapse) weights or weighting coefficients. Because of the nonlinearity of their dependence on the weights (parameters $w_1, \ldots, w_W$) and the particularly efficient learning methods with which these weights can be set, neural networks are particularly suitable for modelling virtually any technical systems. In addition, they can be represented in a simple way by means of specific circuit arrangements. Such specific circuit arrangements can interact with a data processing system in order to implement the invention. The aforesaid properties of neural networks are known to the person skilled in the art from the extensive literature on artificial neural networks.

Once the parameters of such a function system have been set in such a way that this function system models, that is to say approximates with adequate precision, the technical system under consideration, the function system can be used in a specific embodiment of the invention to generate a table of numerical values which contains the values of all the functions of the system for a sufficiently large number of values of its variables $x_1, \ldots, x_{S+B}$ as entries. For the purposes of the invention, this table then represents the function system. It has the advantage that it can be stored for example in a storage unit of a data processing system. As a result, there is no longer a need for processing power or specific circuit technology for calculating function values.

A function system of the type mentioned above can however also be represented by specific software routines which can be executed by a data processing system in order to implement the invention.

Which function system the person skilled in the art will select in order to model a given technical system and how he will represent this function system for a specific application—as a table, as a specific circuit, as a software routine etc.—depends on the specific conditions of the application.

Such a model of a technical system in the form of a parametric set of functions is used according to the invention to replace this technical system for the optimization of the target function $Z = g(y_1, \ldots, y_N)$ in such a way that the manipulated variables $s_1, \ldots, s_S$ are determined by optimizing the function $g(f_1(w_1, \ldots, w_W, s_1, \ldots, s_S, b_1, \ldots, b_B), \ldots, f_N(w_1, \ldots, w_W, s_1, \ldots, s_S, b_1, \ldots, b_B))$ at fixed values of $w_1, \ldots, w_W$ and $b_1, \ldots, b_B$. By virtue of this replacement, the function $z = g(y_1, \ldots, y_N)$ of the unknown system properties $y_1, \ldots, y_N$ becomes a function of the known parameters $w_1, \ldots, w_W$ and operational variables $b_1, \ldots, b_B$ to be fixed and of the manipulated variables $s_1, \ldots, s_S$ which are to be determined and varied.

Any suitable optimization process can be used to optimize this function. Large numbers of very different optimization processes are known to the person skilled in the art from the mathematical literature for engineers. Which of these processes is particularly suitable in a concrete application depends on the specific conditions of this application.

One possible optimization process is the so-called process of steepest descent. This process is appropriate if the searched for optimum of the target function to be optimized is a local optimum (local minimum or maximum), and if the target function is adequately smooth. Here—starting from initial estimated values sO/i of the manipulated variables $s_1, \ldots, s_S$ which must lie in the domain of attraction of the searched for optimum—the manipulated variables are incrementally changed according to the schema:

$$s_i^{k+1} = s_i^k - \eta \cdot \left( \frac{\partial g}{\partial s_i} \right)_{w,b} = s_i^k - \eta \cdot \sum_j \frac{\partial g}{\partial f_j} \left( \frac{\partial f_j}{\partial s_i} \right)_{w,b}$$

Here, $\eta$ is a preliminary factor whose values are to be selected as a function of the specific conditions of the application. The mathematical literature for engineers gives comprehensive indications to the person skilled in the art as to how he has to select the values for $\eta$ for the optimization process to have a successful result. However, the invention can also be successfully carried out in conjunction with other, for example stochastic optimization processes (simulated annealing, random walk etc.). There are a large number of relevant textbooks and specialist publications, written for technicians and engineers, on this subject, which the person skilled in the art can use to select and implement without difficulty an optimization process suitable for his application.

If a parametric function, model exists for a given technical system $\phi$, a further function model for a similar system $\psi$ can frequently be produced from it in that—starting from the parameter values of the existing model—these parameters are changed in such a way that ultimately the system $\psi$ is modelled. The outlay on preparing parametric function models can thereby be considerably reduced.

The process according to the invention can be advantageously used to set the manipulated variables of a technical system in a closed control loop in such a way that the control error of the closed control loop is minimized. The single FIGURE shows a schematic view of this application. In this embodiment of the invention, the system $\phi$ to be controlled is modelled using the parametric function system within the control loop. In such applications, it will generally be advantageous to represent this parametric function model using a stored numerical table (for example in the ROM, EEPROM etc. of an electronic control system) or using a specific circuit arrangement (for example ASIC). In this way, a control system for controlling a technical system ($\phi$) with the following features can be constructed:

a) the controller identifies manipulated variables for the system to be controlled, by means of prescribed values for operational variables $b_1, \ldots, b_B$ of the system ($\phi$) to be controlled, by minimizing a control error z as claimed in claim 5;

b) the system ($\phi$) to be controlled supplies measured values for system properties $y_1, \ldots, y_N$ where $y_i = \phi_i(s_1, \ldots, s_S, b_1, \ldots, b_B)$ which are themselves used to determine the control error $z = g(y_1, \ldots, y_N)$.

In a preferred embodiment of this control system according to the invention, the control error is identified from the system properties $y_1, \ldots, y_N$ and from desired values $Y_1^{des}, \ldots, Y_N^{des}$ for these system properties. Generally, it is particularly advantageous here if the control error is identified from the system properties $y_1, \ldots, y_N$ and from desired values $Y_1^{des}, \ldots, Y_N^{des}$ for these system properties in the form $z = g(y_1 - Y_1^{des}, \ldots, y_N - Y_N^{des})$.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A process for determining optimum values for manipulated variables of a technical system for prescribed operational variables for optimizing a prescribed target function of system properties, comprising the steps of:

a) using a set of functions whose parameters are set such that the functions of the set of functions model the system such that functions contained in the set of functions approximate system functions of the system properties as functions of variables of the set of functions in terms of an interval of prescribed magnitude, and b) determining the manipulated variables by optimizing the set of functions at fixed values of the parameters and the operational variables;

c) controlling the technical system via the determined manipulated variable.

2. The process as claimed in claim 1, wherein the set of functions is an artificial neural network.

3. The process as claimed in claim 1, wherein the set of functions is a table of numerical values which is stored in a storage unit of a data processing system.

4. The process as claimed in claim 1, wherein the set of functions is an electronic circuit arrangement which is a component of an electronic data processing system that carries out the process.

5. The process as claimed in claim 1, wherein the process is used for controlling a technical system, the target function being a control error of a controller and manipulated variables of the controller being identified using said process.

6. A control system for controlling a technical system, comprising:

a) a controller for identifying manipulated variables for the system to be controlled, by means of prescribed values for operational variables of the system to be controlled, by minimizing a control error;

b) measured values for system properties, the measured values being supplied by the system to be controlled and the system properties being a function of the manipulated variables and the operational variables used to determine the control error;

c1) a set of functions whose parameters are set such that functions that are contained in the set of functions model the system such that the functions of the set of functions approximate system functions of the system as functions of variables of the set of functions in terms of an interval of prescribed magnitude; and c2) the manipulated variables being determined by optimizing the set of functions at fixed values of the parameters and the operational variables.

7. The control system as claimed in claim 6, wherein the control error is identified from system properties and from desired values for said system properties.

8. The control system as claimed in claim 6, wherein the control error is identified from system properties and from desired values for said system properties in the form $z = g(Y_1 - Y_1^{des}, \ldots, Y_N - Y_N^{des})$ where $Y_1, \ldots, Y_N$ are the system properties and $Y_1^{des}, \ldots, Y_N^{des}$ are the desired values.

9. The process as claimed in claim 1, wherein the set of functions is an electronic circuit arrangement which interacts with an electronic data processing system.

* * * * *